US012701049B2

(12) United States Patent
Chen et al.

(10) Patent No.: US 12,701,049 B2
(45) Date of Patent: Aug. 4, 2026

(54) INTERACTIVE DATA TRANSMISSION METHOD, SYSTEM AND APPARATUS, STORAGE MEDIUM AND ELECTRONIC DEVICE

(71) Applicant: SUZHOU METABRAIN INTELLIGENT TECHNOLOGY CO., LTD., Suzhou (CN)

(72) Inventors: Chaofan Chen, Suzhou (CN); Baoyang Liu, Suzhou (CN); Jiaming Huang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/142,854

(22) PCT Filed: Jun. 20, 2024

(86) PCT No.: PCT/CN2024/100456
§ 371 (c)(1),
(2) Date: Jun. 24, 2025

(87) PCT Pub. No.: WO2025/118547
PCT Pub. Date: Jun. 12, 2025

(65) Prior Publication Data
US 2026/0121923 A1      Apr. 30, 2026

(30) Foreign Application Priority Data
Dec. 5, 2023     (CN) .......................... 202311655918.5

(51) Int. Cl.
H04L 41/083        (2022.01)
G06F 13/42         (2006.01)
H04L 41/08         (2022.01)

(52) U.S. Cl.
CPC ........ *H04L 41/083* (2013.01); *G06F 13/4282* (2013.01); *H04L 41/0889* (2013.01)

(58) Field of Classification Search
CPC   H04L 41/083; H04L 41/0889; G06F 13/4282
See application file for complete search history.

(56) References Cited

U.S. PATENT DOCUMENTS

2020/0169792 A1 *   5/2020   Clift ..................... H04N 21/631
2022/0137969 A1     5/2022   Gupta et al.

FOREIGN PATENT DOCUMENTS

CN          107018054 A      8/2017
CN          108090012 A  *   5/2018   ........... G06F 13/382
(Continued)

OTHER PUBLICATIONS

Translation of CN-108090012-A (Year: 2018).*

*Primary Examiner* — Henry Tsai
*Assistant Examiner* — John B Roche
(74) *Attorney, Agent, or Firm* — IPro, PLLC

(57)      ABSTRACT

An interactive data transmission method is provided. The method includes: receiving a first interactive command sent by a baseboard management controller of a target device via a first communication interface through a specified logic device, the first interactive command is configured to indicate to send an interactive command of a specified interactive type to a specified accelerator card in the set of accelerator cards; querying a command data set being pre-stored to obtain target command data, the command data set includes a set of command data corresponding to each accelerator card in the set of accelerator cards, and the target command data is command data of the specified interactive type corresponding to the specified accelerator card; and converting the target command data into a second interactive command through the specified logic device, and sending (Continued)

the second interactive command to the specified accelerator
card via the second communication interface.

20 Claims, 4 Drawing Sheets

(56) References Cited

FOREIGN PATENT DOCUMENTS

| | | | |
|---|---|---|---|
| CN | 109240966 | A | 1/2019 |
| CN | 112131084 | A | 12/2020 |
| CN | 115543755 | A | 12/2022 |
| CN | 116126353 | A | 5/2023 |
| CN | 117376110 | A | 1/2024 |

* cited by examiner

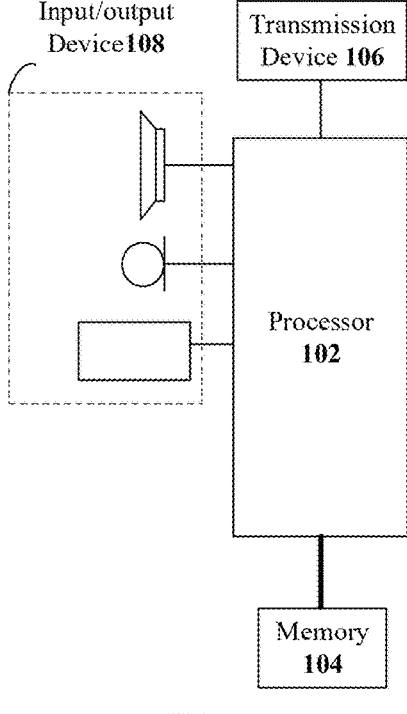

FIG. 1

| First interactive command sent by the baseboard management controller via the first communication interface is received through the specified logic device, where the first interactive command is configured to indicate to send an interactive command of a specified interactive type to a specified accelerator card in the set of accelerator cards | S202 |
|---|---|
| Command data set being prestored is queried through the specified logic device to obtain target command data in response to the first interactive command, where the command data set includes a set of command data corresponding to each accelerator card in the set of accelerator cards, and the target command data is command data of the specified interactive type corresponding to the specified accelerator card | S204 |
| The target command data is converted into a second interactive command through the specified logic device, and sending the second interactive command to the specified accelerator card via the second communication interface through the specified logic device | S206 |

FIG. 2

INTERACTIVE DATA TRANSMISSION METHOD, SYSTEM AND APPARATUS, STORAGE MEDIUM AND ELECTRONIC DEVICE

CROSS-REFERENCE TO RELATED APPLICATION

The present disclosure claims the priority of Chinese patent application filed on Dec. 5, 2023 before the CNIPA, China National Intellectual Property Administration with the application number of 202311655918.5, and the title of "INTERACTIVE DATA TRANSMISSION METHOD, SYSTEM AND APPARATUS, STORAGE MEDIUM AND ELECTRONIC DEVICE", which is incorporated herein in its entirety by reference.

FIELD

Embodiments of the present disclosure relate to the field of firmware, and more particularly to an interactive data transmission method, system and apparatus, a non-transitory readable storage medium and an electronic device.

BACKGROUND

At present, accelerator cards can be applied to any device that needs to improve speed and performance, for example, servers, network devices, and the like, and a device can be provided with a plurality of accelerator cards to adapt to different application requirements. Since there are many manufacturers of accelerator cards, in order to make a system of the device compatible with accelerator cards from different manufacturers, a method of adapting various accelerator cards individually through a baseboard management controller (BMC) on the device is used in the related art. However, when a management interface is adapted individually, extra code needs to be written to deal with adaptation logic, resulting in increased code complexity. In addition, an individual adaptation will lead to repeated work and increase development time and cost. That is, the management interface that is individually adapted has problems of long adaptation period and low adaptation efficiency.

SUMMARY

Embodiments of the present disclosure provide an interactive data transmission method, system and apparatus, a non-transitory readable storage medium and an electronic device, so as to at least solve the problem of low adaptation efficiency due to the need for the individual adaptation of various accelerator cards through the BMC in the interactive data transmission method in the related art.

According to an embodiment of the present disclosure, there is provided an interactive data transmission method, applied to a target device, where the target device includes a baseboard management controller, a specified logic device and a set of accelerator cards, where the baseboard management controller sends an interactive command corresponding to the set of accelerator cards to the specified logic device and a communication interface being used is a first communication interface, the specified logic device sends an interactive command to the set of accelerator cards and a communication interface being used is a second communication interface, and the method includes: receiving a first interactive command sent by the baseboard management controller via the first communication interface through the specified logic device, where the first interactive command is configured to indicate to send an interactive command of a specified interactive type to a specified accelerator card in the set of accelerator cards; querying a command data set being prestored through the specified logic device to obtain target command data in response to the first interactive command, where the command data set includes a set of command data corresponding to each accelerator card in the set of accelerator cards, and the target command data is command data of the specified interactive type corresponding to the specified accelerator card; and converting the target command data into a second interactive command through the specified logic device, and sending the second interactive command to the specified accelerator card via the second communication interface through the specified logic device.

According to another embodiment of the present disclosure, there is provided an interactive data transmission system, including: a baseboard management controller, a specified logic device and a set of accelerator cards, where the baseboard management controller sends an interactive command corresponding to the set of accelerator cards to the specified logic device and a communication interface being used is a first communication interface, the specified logic device sends an interactive command to the set of accelerator cards and a communication interface being used is a second communication interface, where the baseboard management controller is configured to send a first interactive command to the specified logic device via the first communication interface, where the first interactive command is configured to indicate to send an interactive command of a specified interactive type to a specified accelerator card in the set of accelerator cards; and the specified logic device is configured to receive the first interactive command, query a command data set being prestored to obtain target command data in response to the first interactive command, convert the target command data into a second interactive command, and send the second interactive command to the specified accelerator card via the second communication interface, where the command data set includes a set of command data corresponding to each accelerator card in the set of accelerator cards, and the target command data is command data of the specified interactive type corresponding to the specified accelerator card.

According to yet another embodiment of the present disclosure, there is provided an interactive data transmission apparatus, applied to a target device, where the target device includes a baseboard management controller, a specified logic device and a set of accelerator cards, where the baseboard management controller sends an interactive command corresponding to the set of accelerator cards to the specified logic device and a communication interface being used is a first communication interface, the specified logic device sends an interactive command to the set of accelerator cards and a communication interface being used is a second communication interface, and the apparatus includes: a first receiving unit configured to receive a first interactive command sent by the baseboard management controller via the first communication interface through the specified logic device, where the first interactive command is configured to indicate to send an interactive command of a specified interactive type to a specified accelerator card in the set of accelerator cards; a query unit configured to query a command data set being prestored through the specified logic device to obtain target command data in response to the first interactive command, where the command data set includes a set of command data corresponding to each accelerator card in the set of accelerator cards, and the target command data is command data of the specified interactive type corresponding to the specified accelerator card; and a first execution unit configured to convert the target command data into a second interactive command through the specified logic device, and send the second interactive command to the specified accelerator card via the second communication interface through the specified logic device.

According to another aspect of an embodiment of the present disclosure, there is provided a computer non-transitory readable storage medium, including: a stored program, where when the program runs, the steps in any one of the above method embodiments are performed.

According to yet another aspect of an embodiment of the present disclosure, there is provided an electronic device, including: a memory and a processor, where a computer program is stored in the memory, and the processor is configured to perform the steps in any one of the above method embodiments through the computer program.

According to the embodiments of the present disclosure, by converting the management interface between the baseboard management controller and the accelerator card, which performs management data interaction and is adapted individually, into a unified interactive command interface between the baseboard management controller and the specified logic device and between the specified logic device and a set of accelerator cards, the interaction between the baseboard management controller and any accelerator card in the set of accelerator cards may be realized through a unified communication interface between the baseboard management controller and the specified logic device and between the specified logic device and the set of accelerator cards, without the need for individual interface adaptation between the baseboard management controller and each accelerator card in the set of accelerator cards. By querying the command data corresponding to the specified accelerator card through the specified logic device, converting queried command data and sending the queried command data to the specified accelerator card through the communication interface between the specified logic device and the accelerator card, the management data interaction between the baseboard management controller and the specified accelerator card may be realized. Based on this, the adaptation period of the baseboard management controller may be shortened, and the purpose of quickly adapting various accelerator cards may be realized, thereby solving the problem of low adaptation efficiency due to the need for the individual adaptation of various accelerator cards through the BMC in the interactive data transmission method in the related art.

BRIEF DESCRIPTION OF THE DRAWINGS

FIG. 1 is a block diagram of a hardware structure of a server device for an interactive data transmission method according to an embodiment of the present disclosure.

FIG. 2 is a flowchart of an interactive data transmission method according to an embodiment of the present disclosure.

DETAILED DESCRIPTION

Figure 3:
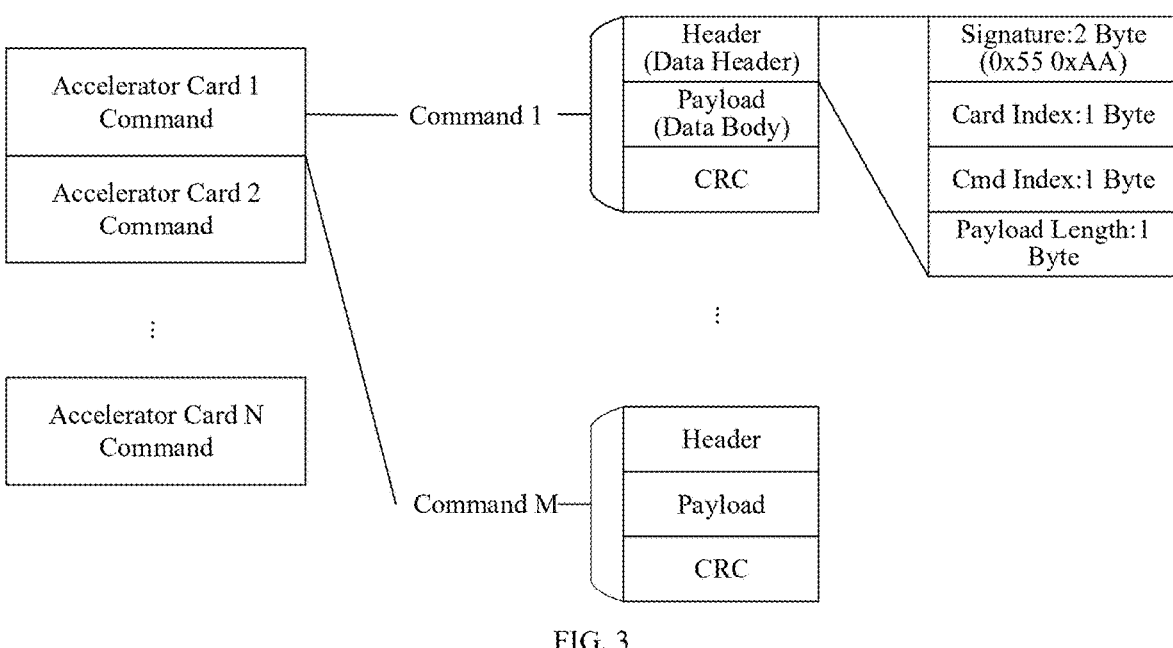
FIG. 3 is a schematic diagram of a command storage format of an accelerator card for an interactive data transmission method according to an embodiment of the present disclosure.

Hereinafter, embodiments of the present disclosure will be described in detail with reference to accompanying drawings and in combination with the embodiments.

It should be noted that terms "first", "second", and the like in the specification and claims of the present disclosure and the accompanying drawings are used to distinguish similar objects and do not necessarily need to be used to describe a specific order or sequence.

Unless otherwise defined, meanings of all technical and scientific terms used herein are the same as those usually understood by a person skilled in the art to which the present disclosure belongs. Terms used herein are merely intended to describe the embodiments of the present disclosure, but are not intended to limit the present disclosure.

Method embodiments provided in the embodiments of the present disclosure may be performed in a server device or a similar computing apparatus. Taking running on a server device as an example, FIG. 1 is a block diagram of a hardware structure of a server device for an interactive data transmission method according to an embodiment of the present disclosure. As shown in FIG. 1, the server device can include one or more (there is only one shown in FIG. 1) processors 102 (the processors 102 can include, but are not limited to, processing apparatuses such as microprocessors MCU or programmable logic devices FPGA) and a memory 104 configured to store data. The above server device may further include a transmission device 106 configured to achieve a communication function and an input/output device 108. A person skilled in the art may understand that the structure shown in FIG. 1 is only schematic, which does not limit the structure of the above server device. For example, the server device may further include more or less components than those shown in FIG. 1, or have different configurations from those shown in FIG. 1.

The memory 104 may be configured to store a computer program, for example, a software program of application software and a module, for example, a computer program corresponding to an interactive data transmission method in the embodiments of the present disclosure. The processor 102 runs the computer program stored in the memory 104, so as to execute various functional applications and data processing, that is, to realize the above method. The memory 104 can include a high speed random access memory, and may further include a non-transitory memory, for example, one or more magnetic storage apparatuses, a flash memory, or other non-transitory solid-state memories. In some examples, the memory 104 can include memories remotely disposed relative to the processor 102. These remote memories may be connected to the server device via a network. Examples of the above network include, but are not limited to, the Internet, an intranet, a local area network, a mobile communication network, and a combination thereof.

The transmission device 106 is configured to receive or send data via the network. An example of the above network can include a wireless network provided by a communication provider of the server device. In an example, the transmission device 106 includes a network interface controller (NIC), and may be connected to other network devices through a base station, so as to communicate with the Internet. In an example, the transmission device 106 is a radio frequency (RF) module, which is configured to communicate with the Internet in a wireless manner.

In this embodiment, there is provided an interactive data transmission method. FIG. 2 is a flowchart of an interactive data transmission method according to an embodiment of the present disclosure. As shown in FIG. 2, the flowchart includes following steps.

Step S202, a first interactive command sent by the baseboard management controller via the first communication interface is received through the specified logic device, where the first interactive command is configured to indicate to send an interactive command of a specified interactive type to a specified accelerator card in the set of accelerator cards.

The interactive data transmission method in this embodiment can be applied to a target device, and the scenario of the accelerator card is managed by the baseboard management controller (that is, BMC) of the target device. The BMC is an individual management controller on the target device (for example, a server), which is responsible for monitoring and managing the hardware and a running state of the target device. The accelerator card is a hardware device used to improve the performance of the device, which is usually used to accelerate computing, network processing or storage operations. In some device architectures (for example, server architectures), the BMC can monitor and manage one or more accelerator cards to ensure normal operations of the accelerator cards and provide necessary support. On the other hand, the accelerator card can also communicate with the BMC to send state information or receive management commands, so that the BMC may better control the overall performance and stability of the target device.

However, due to the lack of a unified management interface specification in the design of acceleration cards by different manufacturers, there are significant differences in the management methods of acceleration cards produced by each manufacturer. The information content supported by different manufacturers is not consistent, and specific protocols and command formats for obtaining the same information are also different. The diversity of management interfaces brings considerable difficulties and challenges to the adaptive application of accelerator cards in device systems.

Here, the unified management interface specification means that all management interfaces (including user management, authority management, data management, and the like) in a system or a platform follow a unified specification and standard, which may ensure that different management interfaces have consistent structure and behavior, thereby improving the stability, maintainability and expansibility of the system. The unified management interface specification can specify naming rules, parameter formats, return result formats, error handling methods, and some common functions such as identity authentication and authorization verification. Through the unified management interface specification, the development and call of the interface may be simplified, the coupling degree of the system may be reduced, and the development efficiency and the overall quality of the system may be improved.

The management interface refers to an interface used to manage a system or a device, through which operations such as configuration, monitoring, maintenance, and management can be performed on the system or the device. The management interface usually provides a set of commands, protocols or application programming interfaces, so that administrators or management software may interact with the system or the device and perform various management operations. The management interface can be a physical interface (for example, a serial port and a network port) or a software interface, depending on characteristics and requirements of the system or the device.

In order to be compatible with accelerator cards from different manufacturers, the traditional practice of device manufacturers is to perform an individual adaptation for each accelerator card through the BMC. However, in the face of numerous management interfaces, this method has relatively high adaptation difficulty and a relatively long adaptation period, and involves a large amount of repetitive work. Therefore, there is a problem of low adaptation transmission efficiency due to the need for individual adaptation of each accelerator card through the BMC.

In order to at least partially solve the above problems, in this embodiment, a specified logic device unit is introduced between the BMC and an accelerator card unit, management data interaction between the BMC and the accelerator card is converted into a unified interactive command interface between the BMC and the specified logic device unit. Since the interface between the BMC and the specified logic device is a unified interface, the management function of different accelerator cards may be indirectly realized only by the BMC implementing the interface protocol, thereby improving the firmware adaptation efficiency of the BMC side.

For the target device, the target device can include a baseboard management controller, a specified logic device and a set of accelerator cards. A communication interface being used by the baseboard management controller to send an interactive command corresponding to the set of accelerator cards to the specified logic device is a first communication interface, and a communication interface being used by the specified logic device to send an interactive command to the set of accelerator cards is a second communication interface. When the BMC needs to interact with a specified accelerator card in a set of accelerator cards, the BMC can send the first interactive command to the specified logic device through the first communication interface, and the specified logic device can receive the first interactive command sent by the BMC through the first communication interface. Here, the first interactive command can be used to indicate to send an interactive command of a specified interactive type to a specified accelerator card in the set of accelerator cards, and the specified interactive type can include, but is not limited to, a firmware version obtaining command, a temperature obtaining command, a power consumption obtaining command and a manufacturer information obtaining command, and the like, for obtaining a firmware version, temperature, power consumption and manufacturer information of the accelerator card.

The first interactive command can carry an address of the specified logic device. In order to perform data interaction with the specified accelerator card in the set of accelerator cards, the first interactive command can also carry identifier information of the specified accelerator card, and indication information of the specified interactive type, for indicating the specified accelerator card and the specified interactive type.

Step S204, a command data set being prestored is queried through the specified logic device to obtain target command data in response to the first interactive command, where the command data set includes a set of command data corresponding to each accelerator card in the set of accelerator cards, and the target command data is command data of the specified interactive type corresponding to the specified accelerator card.

After receiving the first interactive command, the specified logic device can query the command data set being prestored to obtain the target command data in response to the first interactive command. Here, the command data set can be stored in a memory of the target device, for example, a read-only memory (ROM), a random access memory (RAM), and the like. The command data set may contain a set of command data corresponding to each accelerator card in the set of accelerator cards, and the target command data may be command data of the specified interactive type corresponding to the specified accelerator card. The target command data can include, but is not limited to, command data of different interactive types corresponding to different accelerator cards defined by various manufacturers. Each accelerator card can correspond to a plurality of interactive types, and the command data of different accelerator cards for the same interactive type may be the same or different, which is not limited in this embodiment.

Querying the target command data may be implemented based on the specified accelerator card and the indication information of the specified interactive type carried in the first interactive command.

Step S206, the target command data is converted into a second interactive command through the specified logic device, and sending the second interactive command to the specified accelerator card via the second communication interface through the specified logic device.

In the case where the target command data is queried through the specified logic device, the target command data can be converted into the second interactive command through the specified logic device, and the second interactive command can be sent to the specified accelerator card via the second communication interface through the specified logic device. The second interactive command can be a command that conforms to a communication protocol format of the second communication interface.

In order to make the specified accelerator card "know" that the second interactive command is sent to "oneself", the second interactive command may carry identifier information for identifying the specified accelerator card, for example, address information of the specified accelerator card.

According to the above steps provided in the embodiment of the present disclosure, by receiving a first interactive command sent by the baseboard management controller via the first communication interface through the specified logic device, where the first interactive command is configured to indicate to send an interactive command of a specified interactive type to a specified accelerator card in the set of accelerator cards; querying a command data set being prestored through the specified logic device to obtain target command data in response to the first interactive command, where the command data set includes a set of command data corresponding to each accelerator card in the set of accelerator cards, and the target command data is command data of the specified interactive type corresponding to the specified accelerator card; and converting the target command data into a second interactive command through the specified logic device, and sending the second interactive command to the specified accelerator card via the second communication interface through the specified logic device, the problem of low adaptation efficiency due to the need for the individual adaptation of various accelerator cards through the BMC in the interactive data transmission method in the related art is solved, and the adaptation efficiency of accelerator cards is improved.

In an exemplary embodiment, querying the command data set being prestored through the specified logic device to obtain the target command data in response to the first interactive command includes:

S11, an accelerator card identifier of the specified accelerator card and a specified command code are extracted from the first interactive command through the specified logic device in response to the first interactive command, where the specified command code is configured to identify the specified interactive type; and S12, the command data set being prestored is queried based on the accelerator card identifier of the specified accelerator card and the specified command code through the specified logic device to obtain the target command data.

In order to identify the interactive type, a command code can be introduced. In this embodiment, the accelerator card identifier of the specified accelerator card and the specified command code can be carried in the first interactive command, and the specified command code can be used to identify the specified interactive type. After receiving the first interactive command, the specified logic device can extract the accelerator card identifier of the specified accelerator card and the specified command code from the first interactive command, and query the prestored command data set based on the accelerator card identifier of the specified accelerator card and the specified command code to obtain the target command data.

Here, similar to the previous embodiments, the command data set can include command data designed by manufacturers corresponding to different interactive types of different accelerator cards. The accelerator card identifier can include, but is not limited to, at least one of a card number of the accelerator card or address information of the accelerator card.

The specified command code can be a command code between the BMC and the specified logic device for identifying the specified interactive type, which may be the same as the specified command codes of the specified interactive types of different accelerator cards corresponding to the specified interactive type, or may be different from the command code of the same specified interactive type of different accelerator cards corresponding to the specified interactive type of the specified accelerator card, which is not limited in this embodiment.

For example, in this embodiment, the specified command codes of the specified interactive types of different accelerator cards may be the same, and the command codes correspond to the interactive types. A feasible definition manner of command code can be shown in Table 1.

TABLE 1

| Serial Number | Command Type | Command Name | Command Code |
|---|---|---|---|
| 1 | General command | Firmware Version | 0x01 |

TABLE 1-continued

| Serial Number | Command Type | Command Name | Command Code |
|---|---|---|---|
| 2 | General command | Obtaining Command Temperature Obtaining Command | 0x02 |
| 3 | General command | Power Consumption Obtaining Command | 0x03 |
| 4 | General command | Manufacturer Information Obtaining Command | 0x04 |

Taking the specified accelerator card being an accelerator card 2 and the specified interactive type being obtaining a firmware version as an example, the first interactive command can carry the accelerator card identifier of the specified accelerator card and the specified command code, the accelerator card identifier of the accelerator card 2 and the specified command code "0x01" are extracted from the first interactive command through the specified logic device, the prestored command data set is queried based on the accelerator card identifier of the accelerator card 2 and the specified command code "0x01" through the specified logic device, and the command data for the firmware version obtaining that is set by the manufacturers and corresponds to the accelerator card 2 may be obtained.

It should be noted that in this embodiment, the interactive command between the BMC and the specified logic device only needs to define a fixed command code, that is, standard inter-integrated circuit (I2C, which is a simple and bidirectional two-wire synchronous serial bus) read and write commands may be used for transmission.

According to this embodiment, the interactive type is identified by the command code, and the unified command format for the interaction between the BMC unit and the specified logic device is defined by the unified interface format, and thus the efficiency of obtaining the command data of the specified interactive type corresponding to the specified accelerator card defined by the manufacturers may be improved.

In an exemplary embodiment, querying the command data set being prestored based on the accelerator card identifier of the specified accelerator card and the specified command code through the specified logic device to obtain the target command data includes:

S21, an address mapping table is queried through the specified logic device based on the accelerator card identifier of the specified accelerator card and the specified command code to obtain first storage location information, where the first storage location information is configured to indicate a storage location of the command data of the specified interactive type corresponding to the specified accelerator card, and the address mapping table is configured to store a mapping relationship between a combination of the accelerator card identifier and the command code and the storage location of the command data corresponding to the combination; and S22, the target command data is extracted from the storage location indicated by the first storage location information through the specified logic device.

Similar to the previous embodiments, the command data set includes command data of different interactive types corresponding to at least some accelerator cards in a set of accelerator cards designed by the manufacturers. In order to find the target command data based on the accelerator card identifier of the specified accelerator card and the specified command code, an address mapping table can be introduced. Here, in the case where the specified command code only corresponds to the specified interactive type, the address mapping table can be used to store the mapping relationship between the combination of the accelerator card identifier and the command code and the storage location of the corresponding command data. In the case where the specified command code corresponds to the specified interactive type of the specified accelerator card, the address mapping table can be used to store the mapping relationship between the command code and the storage location of the corresponding command data, that is, the address mapping table can be used to indicate the mapping relationship between the command data of different interactive types of different accelerator cards and the storage location of the command data.

In this embodiment, the first storage location information can be used to indicate the storage location of the command data of the specified interactive type corresponding to the specified accelerator card, and the target command data can be extracted from the storage location indicated by the first storage location information through the specified logic device.

Here, the storage location information of the target command data may be indication information including a starting position and an end position of the target command data, indication information including the starting position and a data length of the target command data, or other indication information used to indicate the storage location of the target command data, which is not limited in this embodiment.

For example, in an exemplary embodiment, taking the storage location information of the target command data including the indication information of the first starting position and the first data length of the target command data as an example, querying the address mapping table through the specified logic device based on the accelerator card identifier of the specified accelerator card and the specified command code to obtain the first storage location information includes:

S31, the address mapping table is queried through the specified logic device based on the accelerator card identifier of the specified accelerator card and the specified command code to obtain first starting position information and first data length information, where the first starting position information is configured to indicate a starting storage location of the command data of the specified interactive type corresponding to the specified accelerator card, the first data length information is configured to indicate a data length of the command data of the specified interactive type corresponding to the specified accelerator card, and the first storage location information includes the first starting position information and the first data length information.

According to this embodiment, the mapping relationship between the command data corresponding to different interactive types of different accelerator cards designed by the manufacturers and the location information of the command data is stored in the address mapping table, and thus the efficiency of obtaining the command data may be improved.

In an exemplary embodiment, each command data in the command data set is stored in a specified data structure in a specified data structure set, and each specified data structure in the specified data structure set includes a data header and a data body, where the data header includes a storage location field for storing a storage location of corresponding command data, an accelerator card identifier field for storing the accelerator card identifier of the corresponding accelerator card and a command code field for storing a corresponding command code, and the data body is configured to store the corresponding command data.

Correspondingly, querying the command data set being prestored based on the accelerator card identifier of the specified accelerator card and the specified command code through the specified logic device to obtain the target command data includes:

S41, the accelerator card identifier field and the command code field of the data header of the each specified data structure are sequentially queried based on the accelerator card identifier of the specified accelerator card and the specified command code through the specified logic device;

S42, second storage location information is extracted from the storage location field of the data header of a target data structure through the specified logic device in response to finding the target data structure, where the accelerator card identifier stored in the accelerator card identifier field of the data header of the target data structure is the same as the accelerator card identifier of the specified accelerator card, the command code stored in the command code field of the data header of the target data structure is the same as the specified command code, and the second storage location information is configured to indicate a storage location of the command data stored in the target data structure; and S43, the target command data is extracted from the storage location indicated by the second storage location information through the specified logic device.

In this embodiment, management interface commands of accelerator cards from different manufacturers can be stored in the command data set in a specific format. Each command data in the command data set can be stored in the specified data structure in the specified data structure set, and each specified data structure in the specified data structure set includes the data header and the data body.

For example, taking the number of a set of accelerator cards being N as an example, commands of N accelerator cards are sequentially stored in the command data set. One of storage solutions is that a command of an accelerator card 1 is stored at an address 0 of a memory, and commands of other accelerator cards are sequentially stored in subsequent addresses according to a space occupied by the commands. The command of each accelerator card consists of two parts, namely the data header (Header) and the data body (Payload).

The data formats of these two parts are introduced as follows.

The Header section is a command header, which is used to describe specific attributes of the command. It is a general part of command storage for each accelerator card, including a storage location field for storing the corresponding command data, an accelerator card identifier field for storing the corresponding accelerator card identifier and a command code field for storing the corresponding command code. Here, the storage location of the command data, the accelerator card identifier and the command code can be similar to the previous embodiments, and will not be repeated here.

The Payload section is a specific storage format of the command, which depends on the command format defined by accelerator card manufacturers and should be consistent with the manufacturers.

Under the storage format of the above command data set, in order to query the target command data, the accelerator card identifier field and the command code field of the data header of each specified data structure can be queried in turn based on the accelerator card identifier of the specified accelerator card and the specified command code through the specified logic device. In the case of matching the accelerator card identifier stored in the accelerator card identifier field of the data header of the specified data structure that is the same as the accelerator card identifier of the specified accelerator card, and the command code stored in the command code field of the data header of the specified data structure that is the same as the specified command code, it can be determined that the specified data structure is the target data structure.

In the specified data structure, the specified command codes of different interactive types are corresponding in the form of command numbers. For example, a command mapping table is configured to represent a corresponding relationship between the specified command code and the command number corresponding to the specified accelerator card, the specified accelerator card and the command number corresponding to the specified accelerator card can be determined by querying the command mapping table, and the target data structure can also be determined by matching the accelerator card identifier and the command number stored in the data header of the specified data structure. Here, the command numbers of different accelerator cards for the same interactive type can be the same. In the case where the specified command code corresponds to different interactive types of different accelerator cards in a set of accelerator cards, that is, in the case where different accelerator cards have different specified command codes for the same interactive type, the data header section of the specified data structure can only contain the command code or the command number corresponding to the command code. Here, the command numbers of different accelerator cards for the same interactive type are different.

It should be noted that the above method is only an example. In this embodiment, other command data designed by the manufacturers that can uniquely locate the target interactive type of the target accelerator card can also be used.

In the case where the target data structure is found, the second storage location information can be extracted from the storage location field of the data header of the target data structure through the specified logic device. Here, the second storage location information can be used to indicate the storage location of the command data stored in the target data structure, and the target command data is extracted from the storage location indicated by the second storage location information through the specified logic device. Similar to the first storage location information, the second storage location information may be indication information including the starting position and the end position of the target command data, indication information including the starting position and the data length of the target command data, or other indication information used to indicate the storage location of the target command data, which is not limited in this embodiment.

In an exemplary embodiment, taking the second storage location information including indication information of a starting position and a data length of the target command data as an example, the storage location field includes a starting position field for storing a starting storage location of the corresponding command data and a data length field for storing a data length of the corresponding command data.

Correspondingly, extracting the second storage location information from the storage location field of the data header of the target data structure through the specified logic device in response to finding the target data structure includes:

S51, second starting position information is extracted from the starting position field of the data header of the target data structure and extracting second data length information from the data length field through the specified logic device in response to finding the target data structure, where the second starting position information is configured to indicate a starting storage location of command data corresponding to the target data structure, the second data length information is configured to indicate a data length of the command data corresponding to the target data structure, and the second storage location information includes the second starting position information and the second data length information.

For example, in this embodiment, the data header (Header) section can include four fields, namely a starting position field (Signature), a card number field (Card Index), a command number field (Cmd Index) and a data length field (Payload Length). The Signature is a fixed 2 bytes (0x55 0xAA), and is used to identify the starting position of the command; the Card Index is the number of accelerator cards in the system, occupies 1 byte and describes 256 accelerator cards; the Cmd Index is the command number of the accelerator cards, occupies 1 byte and defines 256 commands; and the last field is the Payload Length, which is used to describe a byte length of the data body (Payload) section and occupies 1 byte.

According to this embodiment, the management interface commands of accelerator cards from different manufacturers are stored in a specific format using the unified data structure, which may improve the efficiency of data processing, facilitate data query, and reduce the complexity and time cost of data processing.

In an exemplary embodiment, the each specified data structure further includes a check data section for storing check data of the corresponding command data, and the method further includes:

S61, first check data is extracted from the check data section of the target data structure through the specified logic device in response to finding the target data structure; and S62, the target command data is checked based on the first check data through the specified logic device.

In order to improve the security and reliability of data, the check data section can be added to the specified data structure to store the check data of the corresponding command data. For example, as shown in FIG. 3, FIG. 3 is a storage format for accelerator card commands in a command data set. The CRC section is a check section of a command, and data involved in the check can start from the Card Index in the Header section and end at the last byte of the Payload.

In the case where the target data structure is found, the first check data can be extracted from the check data section of the target data structure through the specified logic device, and the target command data can be checked based on the first check data through the specified logic device; if the check is successful, the target command data is converted into a second interactive command; otherwise, the data is discarded, an error is reported, or the check is performed again.

According to this embodiment, whether the target command data in the data structure is valid, complete and correct is checked by the check data section, and thus the quality and safety of the data may be guaranteed, and the reliability and usability of the data may be improved.

In an exemplary embodiment, extracting the accelerator card identifier of the specified accelerator card and the specified command code from the first interactive command through the specified logic device in response to the first interactive command includes:

S71, an accelerator card number of the specified accelerator card and the specified command code are extracted from the first interactive command through the specified logic device in response to the first interactive command, where the accelerator card identifier of the specified accelerator card includes the accelerator card number of the specified accelerator card, the specified command code belongs to a set of preset command codes, and the specified interactive type belongs to a set of preset interactive types, where preset command codes in the set of preset command codes correspond to preset interactive types in the set of preset interactive types one by one, and are the same as preset command codes of command data of the same interactive type corresponding to different accelerator cards in the set of accelerator cards.

In this embodiment, taking the accelerator card identifier carried in the first interactive command being the accelerator card number, and the command codes of the command data of the same interactive type corresponding to different accelerator cards being the same as an example, the accelerator card number of the specified accelerator card and the specified command code can be extracted from the first interactive command through the specified logic device, the specified command code belongs to a set of preset command codes, the specified interactive type belongs to a set of preset interactive types, and the preset command codes in the set of preset command codes correspond to preset interactive types in the set of preset interactive types one by one. The preset interactive types can be, but are not limited to, firmware version acquisition, temperature acquisition, power consumption acquisition and manufacturer information acquisition.

According to this embodiment, the same interactive type of different accelerator cards is identified by the unified command code, which may simplify the volume of the command code set and improve the efficiency of data transmission.

In an exemplary embodiment, before querying the command data set being prestored based on the accelerator card identifier of the specified accelerator card and the specified command code through the specified logic device to obtain the target command data, the above method further includes:

S81, a command code mapping table corresponding to the accelerator card number of the specified accelerator card is searched based on the specified command code through the specified logic device, and the specified command code is updated to a found command code to obtain an updated specified command code, where the command code mapping table is configured to store a mapping relationship between each preset command code in the set of preset command codes and the command code configured for the specified accelerator card.

In the case where the specified command code carried in the first interactive command corresponds to the interactive type, that is, in the case where different accelerator cards have the same specified command code for the same interactive type, the command code corresponding to the accelerator card number of the specified accelerator card can be searched based on the command code mapping table to obtain the updated specified command code, which is the command code of the specified interactive type corresponding to the specified accelerator card, that is, different accelerator cards may have different updated command codes for the same interactive type. The command code mapping table is used to store the mapping relationship between each preset command code in a set of preset command codes and the command code configured for the specified accelerator card.

In an exemplary embodiment, before converting the target command data into the second interactive command through the specified logic device, the above method further includes:

S91, second check data of the target command data is obtained from check data of each command data in the command data set being prestored through the specified logic device; and S92, the target command data is checked based on the second check data through the specified logic device.

In this embodiment, the prestored command data set can include the check data section of the target command data. In the case where the target command data is found based on the address mapping table, the storage location information of the check data section corresponding to the target command data can be indicated based on the address mapping table, or the location relationship between the target command data and the corresponding check data section can be preset. A starting position and an end position of the check data section, or the starting position and a data length of the check data section can be preset. For example, the check data section is set after the command data, and the next bit of the last bit of the command data is the starting position of the check data section, and the like. The second check data of the target command data is obtained from the prestored check data of each command data in the command data set through the specified logic device.

Alternatively, in the case where data is stored in the command data set in a specified data structure including a data header, a data body and check data, the second check data of the target command data is obtained from the prestored check data of each command data in the command data set through the specified logic device.

The target command data is checked based on the second check data through the specified logic device, and the target command data is converted into the second interactive command in the case where the check of the target command data is successful.

According to this embodiment, whether the target command data in the command data set is valid, complete and correct is checked by the check data section, and thus the quality and safety of the data may be guaranteed, and the reliability and usability of the data may be improved.

In an exemplary embodiment, querying the command data set being prestored through the specified logic device to obtain the target command data in response to the first interactive command includes:

S101, the command data set prestored in an electrically erasable programmable read only memory of the target device is queried through the specified logic device to obtain the target command data in response to the first interactive command.

In this embodiment, the command data set can be stored in the electrically erasable programmable read only memory (EEPROM) of the target device. For example, the management interface commands of accelerator cards from different manufacturers are stored in the EEPROM in a specific format by using off chip EEPROM on a server motherboard, and after receiving the first interactive command from the BMC, the specified logic device queries commands sent to the accelerator card in the EEPROM to obtain the target command data.

Here, the off chip EEPROM is an external memory used to store non-transitory data, and the stored data can be modified by electronic erasing and programming operations. Compared to on chip EEPROM, the off chip EEPROM usually has a larger storage capacity and can store more data. It is usually used in conjunction with microcontrollers or other electronic devices to store data that is not easily lost, for example, configuration information, calibration data, user settings, and the like. The off chip EEPROM usually communicates with a main control device through a serial interface such as I2C or a serial peripheral interface (SPI). The off chip EEPROM may be read and written, thereby allowing data to be modified and updated.

According to this embodiment, the command data set is stored in the EEPROM, and data stored in the EEPROM may still be maintained after power failure or restart due to non-transitory characteristics of the EEPROM, thereby ensuring the security and durability of the data.

In an exemplary embodiment, receiving the first interactive command sent by the baseboard management controller via the first communication interface through the specified logic device includes:

S111, the first interactive command sent by the baseboard management controller via a first communication bus via the first communication interface is received through the specified logic device, where the first communication interface includes an inter-integrated circuit (I2C) interface, and the first communication bus includes an I2C bus.

In this embodiment, when the BMC needs to interact with an accelerator card to manage the accelerator card, the BMC first sends a command to the specified logic device through the I2C. For example, the BMC unit has a control core (Core), usually an Arm processor, on which a management system of the BMC, for example, a Linux system, runs. The management business of the accelerator card by the BMC needs to be handled by application programs in the system, and finally the data is sent and received through BMC I2C. The BMC I2C (a master controller) is connected to a specified logic device I2C1 (a slave controller) via an I2C bus to realize data interaction with the specified logic device.

According to this embodiment, the transmission of the interactive command indicating to send the specified interactive type to the specified accelerator card in a set of accelerator cards is realized via a unified I2C communication interface between the specified logic device and the baseboard management controller, so that the baseboard management controller may be prevented from performing individual interface adaptation with each accelerator card in a set of accelerator cards, thereby improving the firmware adaptation efficiency on the BMC side, effectively saving the labor input cost of accelerator card adaptation, improving the application landing speed of accelerator cards, and further reducing the device costs.

In an exemplary embodiment, sending the second interactive command to the specified accelerator card via the second communication interface through the specified logic device includes:

S121, the second interactive command is sent to the specified accelerator card via a second communication bus via the second communication interface through the specified logic device, where the second communication interface includes an inter-integrated circuit (I2C) interface, and the second communication bus includes an I2C bus.

For example, in this embodiment, after receiving the command from the BMC, the specified logic device queries the prestored command data set to obtain target command data, converts the target command data into a command sent to the specified accelerator card, and sends the command to the corresponding accelerator card via the I2C bus. That is, the target command data is converted into commands that are compatible with the specified accelerator card and conform to the I2C communication protocol format, and the converted commands are sent to a set of accelerator cards via the I2C interface.

In an exemplary embodiment, querying the command data set being prestored through the specified logic device to obtain the target command data in response to the first interactive command includes:

S131, a data query command is sent to a specified memory via the second communication bus through the specified logic device in response to the first interactive command, and the target command data returned by the specified memory is received via the second communication bus, where the command data set is prestored in the specified memory, and the data query command is configured to query the command data of the specified interactive type corresponding to the specified accelerator card.

In this embodiment, data transmission between the specified logic device and the specified memory and between the specified logic device and a set of accelerator cards can be performed via the same communication bus. For example, the specified logic device can be connected to the I2C bus through an I2C interface to realize data transmission between the specified logic device and a set of accelerator cards and specified memory. In response to the first interactive command, the specified logic device can send the data query command to the specified memory via the second communication bus, and receive the target command data returned by the specified memory via the second communication bus. The command data set is prestored in the specified memory, and the data query command is used to query the command data of the specified interactive type corresponding to the specified accelerator card.

In an exemplary embodiment, the second interactive command carries an accelerator card address of the specified accelerator card. Correspondingly, after sending the second interactive command to the specified accelerator card via the second communication interface through the specified logic device, the method further includes:

S141, the second interactive command is received from the second communication bus via the I2C interface of the specified accelerator card through the specified accelerator card, and extracting the accelerator card address carried in the second interactive command;

S142, the target command data is extracted from the second interactive command through the specified accelerator card in response to determining that the accelerator card address carried in the second interactive command is the same as the accelerator card address of the specified accelerator card; and S143, first response data of the target command data is converted into a first response command through the specified accelerator card in response to the target command data, and the first response command is sent to the specified logic device via the second communication bus through the I2C interface of the specified accelerator card to enable the specified logic device to send the first response data carried in the first response command to the baseboard management controller.

In order to help interactive parties confirm each other's identities and positions, ensure that information and instructions are sent to correct devices, and increase the accuracy and security of the interaction, the second interactive command can carry the accelerator card address of the specified accelerator card. Here, the accelerator card address of the specified accelerator card can be carried in the first interactive command sent by the BMC to the specified logic device, and then carried in the second interactive command; or can be obtained by specifying the corresponding relationship between the accelerator card identifier of a set of accelerator cards stored in the memory and the address information of the accelerator cards, and then carried in the second interactive command; or can also be obtained in other ways, which is not limited in this embodiment.

For example, in this embodiment, each accelerator card in a set of accelerator cards receives a command from the specified logic device through its own communication interface (for example, the I2C interface), and determines whether the command is sent to itself through address comparison. If the address information matches itself, it responds to the command, otherwise it does not respond. The specified accelerator card matching the address information carried in the second interactive command extracts the target command data from the second interactive command, converts the first response data of the target command data into the first response command through the specified accelerator card in response to the target command data, and sends the first response command to the specified logic device via the second communication bus through the I2C interface of the specified accelerator card, so that the specified logic device sends the first response data carried in the first response command to the baseboard management controller.

According to this embodiment, by carrying the address information of the specified accelerator card in a set of accelerator cards in the interactive command between the specified logic device and a set of accelerator cards, the efficiency and reliability of interaction may be improved.

In an exemplary embodiment, after sending the second interactive command to the specified accelerator card via the second communication interface through the specified logic device, the method further includes:

S151, a second response command returned by the specified accelerator card in response to the second interactive command is received through the specified logic device;

S152, command parsing is performed on the second response command through the specified logic device to obtain second response data in response to the second response command; and S153, the second response data is transmitted to the baseboard management controller through the specified logic device.

The specified logic device needs some logic to realize the command processing, including a command receiving and parsing module, and the like. For example, in this embodiment, the specified logic device receives the response command from the specified accelerator card, and can parse the response command through the command receiving and parsing module to obtain the response data corresponding to the specified interactive type of the specified accelerator card, and then transmit the response data to the baseboard management controller through the specified logic device.

In an exemplary embodiment, transmitting the second response data to the baseboard management controller through the specified logic device includes:

S161, a state of a general purpose input/output interface between the specified logic device and the baseboard management controller is set through the specified logic device to inform the baseboard management controller that there is response data to be obtained based on a change of the state of the general purpose input/output interface;

S162, a response data obtaining command sent by the baseboard management controller is received through the specified logic device, where the response data obtaining command is configured to obtain response data sent to the baseboard management controller; and S163, the second response data is sent to the baseboard management controller through the specified logic device in response to the response data obtaining command.

For example, the specified logic device notifies the BMC that the response command has been parsed by setting a change in a state of a general purpose input/output (GPIO) interface between the specified logic device and the baseboard management controller. The BMC sends response data obtaining command to the specified logic device through the BMC I2C, and the specified logic device receives the command from the BMC, converts the parsed data through the command response module and sends the converted data to the BMC.

According to this embodiment, the specified logic device notifies the BMC unit that the response command has been parsed by setting the change in the state of the GPIO, which is simple and easy to realize without complex communication protocol and hardware support. In addition, the change in the state of the GPIO may respond in real time, thereby realizing real-time communication and control.

In an exemplary embodiment, after setting the state of the general purpose input/output interface between the specified logic device and the baseboard management controller through the specified logic device, the above method further includes:

S171, the state of the general purpose input/output interface is detected through the baseboard management controller, an interrupt of the general purpose input/output interface is triggered based on a detected state of the general purpose input/output interface, and the response data obtaining command is sent to the specified logic device.

In this embodiment, the BMC unit can detect the state of the general purpose input/output interface. In the case where a change in the state is detected, the BMC unit can trigger a GPIO interrupt inside the BMC unit, and send the response data obtaining command to the specified logic device through the BMC I2C.

Here, a command code of a control command of the response data obtaining command can be 0xFF. The control command refers to the response data obtaining command, which is mainly used to control the data transmission between the BMC unit and the specified logic device. The usage of this command is that after triggering the GPIO interrupt, the BMC unit sends the command to inform the specified logic device to send the response data to the BMC.

According to this embodiment, the triggered GPIO interrupt may be used to immediately notify the processor when a specific condition occurs, so as to perform the corresponding processing program. This mechanism allows the processor to wait for specific events to occur while performing other tasks, thereby improving the response speed and efficiency of the system.

In an exemplary embodiment, the specified logic device includes a complex programmable logic device, the set of accelerator cards include artificial intelligence accelerator cards, and the interactive command of the specified interactive type includes one of following commands: a firmware version obtaining command, a temperature obtaining command, a power consumption obtaining command and a manufacturer information obtaining command.

Figure 4:
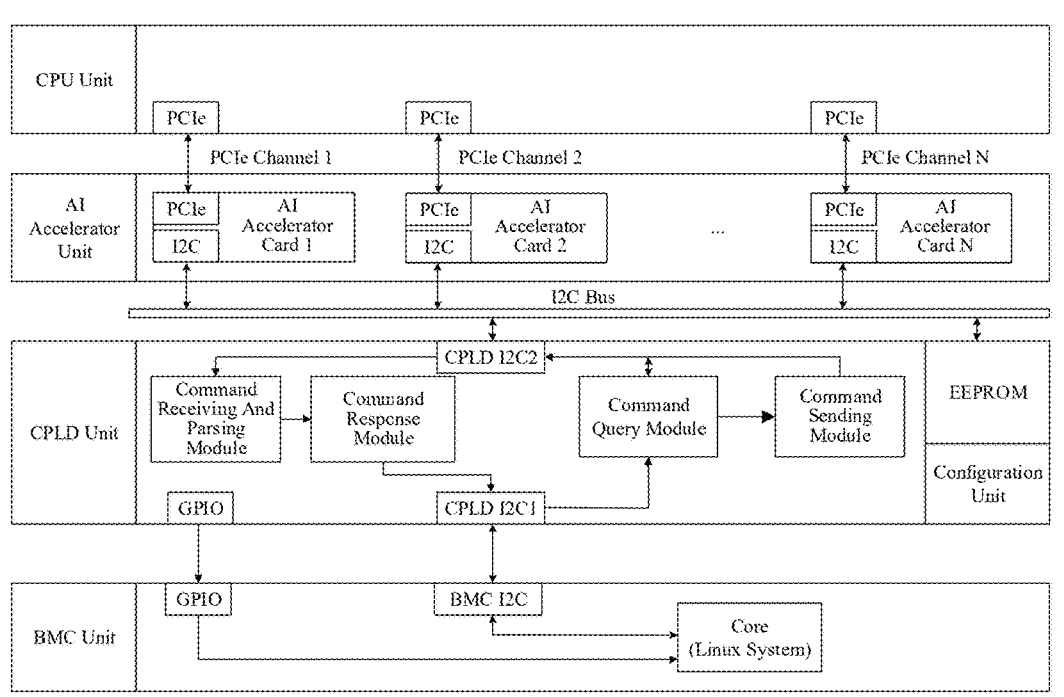
FIG. 4 is a schematic diagram of system architecture for an interactive data transmission method according to an embodiment of the present disclosure.

In this embodiment, the specified logic device can be a complex programmable logic device (CPLD), and a set of accelerator cards can all be artificial intelligence (AI) accelerator cards. Referring to FIG. 4, system architecture including a single CPU and a plurality of AI accelerator cards can be divided into five parts, namely, a BMC unit, a CPLD unit, a configuration unit, an AI accelerator unit and a CPU unit. The connection relationship of each part will be explained in detail below.

First, a BMC realizes data transmission and reception through a BMC I2C. The BMC I2C (the master controller) is connected to a CPLD I2C1 (the slave controller) via an I2C bus to realize data interaction with the CPLD. In addition, interrupt signal transmission is realized between the BMC unit and the CPLD unit through a GPIO.

On the one hand, the CPLD unit interacts with the BMC unit through the CPLD I2C1 and the GPIO, and on the other hand, the CPLD unit is connected to the I2C bus through the CPLD I2C2 (the master controller) to realize data transmission between the CPLD and the AI accelerator unit and between the CPLD and the configuration unit. In addition, in order to realize compatibility with different AI accelerator cards, the CPLD needs some logic to process commands, including a command query module, a command sending module, a command receiving and parsing module and a command response module.

The configuration unit is an EEPROM chip, which is connected to the CPLD unit via the I2C bus and is responsible for command storage of different AI accelerator cards.

The AI accelerator unit includes a plurality of AI accelerator cards, for example, AI accelerator card 1 to AI accelerator card N in FIG. 4. These accelerator cards can be any one of a field-programmable gate array (FPGA), a system-on-a-chip (SOC) or application-specific integrated circuit (ASIC) architecture. As shown in FIG. 4, on the one hand, each AI accelerator card is connected to a CPU through a peripheral component interconnect express (PCIe) channel, and on the other hand, each AI accelerator card is connected to an I2C Bus through an I2C (a slave controller), thereby realizing the interaction of accelerator card management information with the CPLD.

The CPU unit is a computing unit, which is responsible for management and logical operations of the system, and is connected with the AI accelerator unit through the PCIe channel. The CPU unit cooperates with the AI accelerator unit to achieve the goal of significantly improving the computing speed of the system.

In order to be compatible with accelerator cards from different manufacturers, the device system usually uses a manner of individually adapting to various accelerator cards through the BMC unit. In this embodiment, through the system architecture shown in FIG. 4, a plurality of management interfaces individually adapted by the BMC and each accelerator card can be converted into unified interactive command interfaces between the BMC and the CPLD, and between the CPLD and a set of AI accelerator cards. That is, data interaction between the BMC unit and the CPLD unit is performed based on the unified interactive command format through the I2C interface to send identifier information and interactive type of the specified accelerator card that the BMC unit needs to interact with management data to the CPLD unit in the unified interactive command format. The CPLD unit quires the corresponding manufacturer-defined command data prestored in the EEPROM chip via the I2C bus, and converts the quired command data into a command format conforming to the I2C communication protocol, so as to send the interactive command in the command format conforming to the I2C communication protocol to a set of AI accelerator cards via the I2C bus. Since the unified interactive command interface is used between the BMC and the CPLD, and between the CPLD and the set of AI accelerator cards, it is not necessary for the BMC to adapt to each accelerator card individually, thereby solving the problem of low adaptation efficiency due to the need for the individual adaptation of various accelerator cards through the BMC in the interactive data transmission method in the related art.

In an exemplary embodiment, taking firmware version information of an AI accelerator card 2 being obtained by the BMC, a specified logic device being a CPLD and a specified memory being off chip EEPROM as an example, a management method of AI accelerator cards of a server provided in this embodiment is explained.

Due to the lack of a unified management interface specification in the design of AI acceleration cards by different manufacturers, there are significant differences in the management methods of acceleration cards produced by each manufacturer. The information content supported by different manufacturers is not consistent, and specific protocols and command formats for obtaining the same information are also different. The diversity of management interfaces brings considerable difficulties and challenges to the adaptive application of artificial intelligence accelerator cards in server systems. In order to be compatible with accelerator cards from different manufacturers, the traditional practice of server manufacturers is to perform an individual adaptation for each accelerator card through a BMC management unit. Obviously, in the face of numerous management interfaces, this method has relatively high adaptation difficulty and a relatively long adaptation period, and involves a large amount of repetitive work. In addition, the BMC management unit usually involves huge functions and complex code logic, the increase of management adaptation of a large number of accelerator cards will undoubtedly lead to a sharp rise in the difficulty of code debugging, which will seriously affect the landing efficiency of the whole server product. Based on this, it is urgent to find an efficient management method for accelerator cards, so as to improve the application landing speed of AI accelerator cards, and provide a solid guarantee for the rapid application of various AI technologies.

In order to solve the above problems, this embodiment provides an efficient management method for AI accelerator cards in a server. The implementation principle of this method is that management interface commands of AI accelerator cards from different manufacturers are stored in EEPROM in a specific format by using off chip EEPROM on the server motherboard; when a BMC needs to interact with an AI accelerator card to manage the AI accelerator card, the BMC first sends a command to a CPLD through an I2C, and after receiving the command from the BMC, the CPLD queries the command sent to the AI accelerator card in the EEPROM and sends the command to the corresponding accelerator card via an I2C bus; when the AI accelerator card responds, the corresponding response data is first sent to the CPLD through the I2C; the CPLD parses the data by querying the corresponding response data format in the EEPROM, and then notifies the BMC in the form of interrupt through a GPIO interface; after receiving an interrupt signal, the BMC reads the corresponding data via I2C bus, and finally realizes the management of the AI accelerator cards by the BMC. A unified interface protocol is used between the CPLD and the BMC mentioned above.

In this embodiment, the CPLD is used in conjunction with an external EEPROM to realize the compatibility of management interfaces of different AI accelerator cards. Based on the EEPROM, the command storage of different accelerator cards is realized by designing a unified storage format, and a small amount of CPLD logic is used to query and parse the management commands of different accelerator cards. This method has characteristics of high efficiency and strong expansibility. In addition, the interface between the BMC and the CPLD in the proposed method is a unified interface, the management function of different AI accelerator cards may be indirectly realized only by the BMC implementing the interface protocol, thereby greatly improving the firmware adaptation efficiency of the BMC side, and significantly improving the application landing speed of AI accelerator cards.

Figure 5:
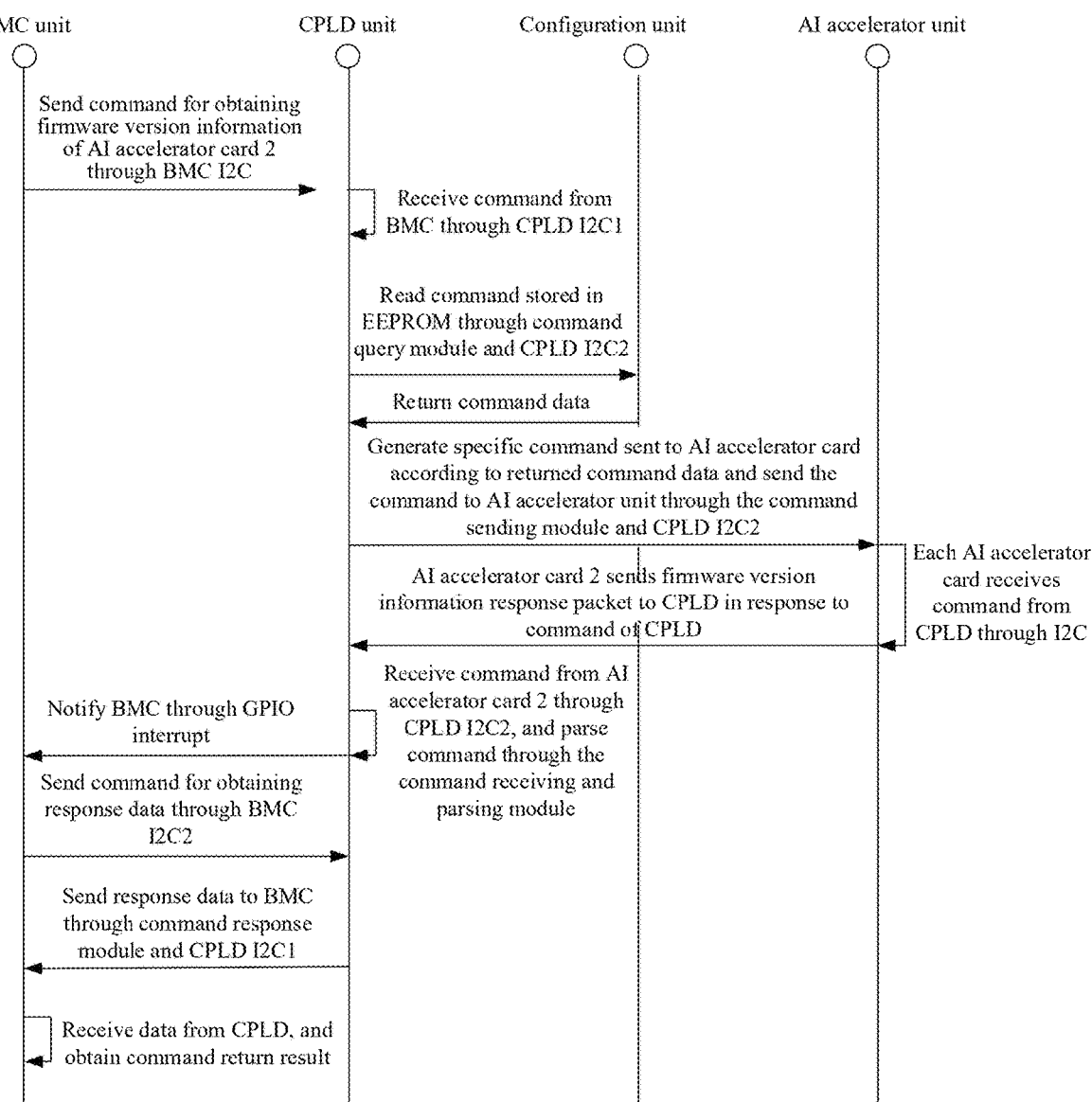
FIG. 5 is a flowchart of another interactive data transmission method according to an embodiment of the present disclosure.

FIG. 5 is a workflow of an interactive data transmission method according to an embodiment of the present disclosure, which can be divided into following steps.

Step 1, a BMC unit sends a command for obtaining firmware version information of an AI accelerator card 2 through a BMC I2C. The command is sent from the BMC unit to a CPLD unit. In this embodiment of the present disclosure, the command that the BMC unit interacts with the CPLD unit is designed to be a unified command format to reduce the code adaptation difficulty when the BMC responds to different AI accelerator cards.

Figure 6:
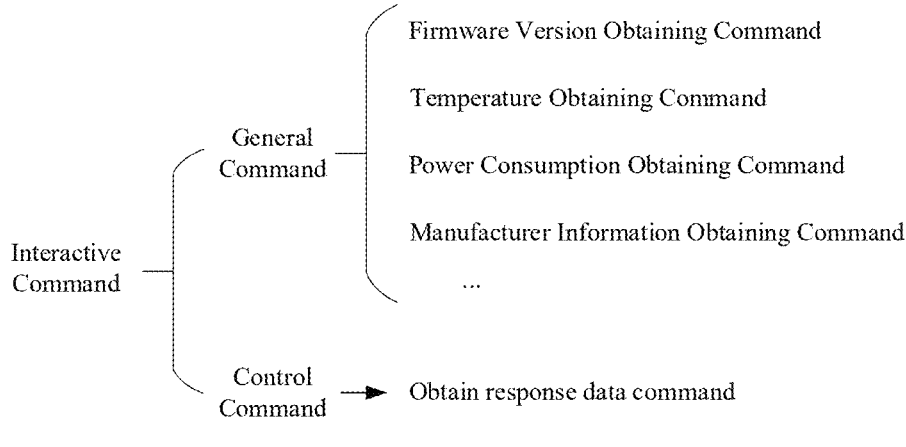
FIG. 6 is a schematic diagram of an interactive command for an interactive data transmission method according to an embodiment of the present disclosure.

The unified interface format defines the unified command format for the interaction between the BMC unit and the CPLD unit. The command for the interaction between the BMC unit and the CPLD unit is shown in FIG. 6, including a general command and a control command. The general command is mainly used for the BMC to manage the AI accelerator cards, including: a firmware version obtaining command, a temperature obtaining command, a power consumption obtaining command and a manufacturer information obtaining command. The control command refers to a response data obtaining command, which is mainly used to control data transmission between the BMC unit and the CPLD unit. The usage of this command is that after triggering a GPIO interrupt, the BMC unit sends this command to inform the CPLD unit to send response data to the BMC. The interactive command defined above only needs to define a fixed command code, that is, standard I2C read and write commands may be used for transmission.

It should be noted that the interactive command between the BMC unit and the CPLD unit not only includes the above mentioned commands, but also may be flexibly expanded as needed during application, and only need to be distinguished by command codes.

Step 2, the CPLD unit receives the command from the BMC unit through a CPLD I2C1, and a CPLD I2C2 reads the corresponding command data stored in an EEPROM of the configuration unit through a command query module. Here, the BMC, the CPLD and the EEPROM maintain the same mapping table. When the BMC sends a command to the CPLD, the command is finally converted into AI accelerator card number (Card Index) information and command number (Cmd Index) information in the EEPROM through a CPLD mapping. The command storage format in the EEPROM can be shown in FIG. 3. The commands of N accelerator cards are sequentially stored in the EEPROM. One of storage solutions is that a command of an AI accelerator card 1 is stored at an address 0 of the EEPROM, and commands of other accelerator cards are sequentially stored in subsequent addresses according to a space occupied by the commands.

Step 3, the EEPROM of the configuration unit returns the command data to the CPLD unit.

Step 4, the CPLD unit converts the received return command data into a command compatible with the AI accelerator card 2 through a command sending module, and sends the converted command to the AI accelerator unit through the CPLD I2C2.

Step 5, each AI accelerator card in the AI accelerator unit receives the command from the CPLD unit through its own I2C interface, and determines whether the command is sent to itself through address comparison. If the address information matches itself, it responds to the command, otherwise it does not respond.

Step 6, the AI accelerator card 2 responds to the command of the CPLD unit and sends a response data packet to the CPLD unit.

Step 7, the CPLD unit receives the response data from the AI accelerator card 2 through the CPLD I2C2, and parses the response data through a command receiving and parsing module to obtain firmware version information of the AI accelerator card 2.

Step 8, the CPLD unit notifies the BMC unit that the response command has been parsed by setting a change in a state of a GPIO.

Step 9, the BMC unit triggers a GPIO interrupt inside the BMC unit, and sends a response data command to the CPLD unit through the BMC I2C.

Step 10, the CPLD unit receives the command from the BMC through the CPLD I2C1, converts the parsed data in step 8 into a command meeting the "unified interface format" through a command response module, and sends the converted data to the BMC unit through the CPLD I2C1.

In step 11, the BMC unit receives the data from the CPLD unit through the BMC I2C, and obtains a final command return result after parsing, that is, the firmware version information of the AI accelerator card 2.

This embodiment provides an efficient management method for AI accelerator cards in a server. By introducing the CPLD unit between the BMC unit and the AI accelerator unit, the management data interaction between the BMC and the AI accelerator card is converted into the unified interactive command interface between the BMC unit and the CPLD unit. The interactive command between the CPLD unit and the AI accelerator unit is defined by the unified storage format in the EEPROM. When the management interface of the AI accelerator card is changed, the command interactive process between the CPLD unit and the AI accelerator unit may be realized only by changing the storage command in the EEPROM, which is friendly to the code adaptation of the BMC management unit, thereby greatly reducing the adaptation difficulty of the BMC unit to different AI accelerator cards, and having characteristics of flexibility, high efficiency and strong expansibility. The proposed method may significantly shorten the adaptation period of the BMC unit, improve the landing and delivery efficiency of server products, and effectively ensure the code adaptation efficiency of the BMC unit when dealing with different AI accelerator cards.

Although the embodiments described in the present disclosure are as above, the above descriptions and definitions are only for the convenience of understanding the embodiments of the present disclosure, and are not intended to limit the present disclosure. Any modifications and changes made without departing from the spirit and scope of the present disclosure, especially the efficient management system architecture, management methods, command storage and the definition of command codes of accelerator cards, are within the protection scope of the present disclosure.

It should be noted that for ease of description, the foregoing method embodiments are stated as a combination of a series of actions. However, a person skilled in the art is to know that the present disclosure is not limited to the described action sequence, because according to the present disclosure, some steps may be performed in another sequence or simultaneously. In addition, a person skilled in the art is also to understand that the embodiments described in this specification are all exemplary embodiments, and the involved actions and modules are not necessarily required by the present disclosure.

According to another aspect of an embodiment of the present disclosure, there is further provided an interactive data transmission system. The system is used to implement the interactive data transmission method provided in the above embodiments, and those that have already been described will not be repeated here. As used below, the term "module" may be a combination of software and/or hardware that implements a predetermined function. Although the apparatus described in the following embodiments is implemented in software, but implementations in hardware, or a combination of software and hardware, are also possible and conceived.

In this embodiment, the above interactive data transmission system includes a baseboard management controller, a specified logic device and a set of accelerator cards, where the baseboard management controller sends an interactive command corresponding to the set of accelerator cards to the specified logic device and a communication interface being used is a first communication interface, the specified logic device sends an interactive command to the set of accelerator cards and a communication interface being used is a second communication interface, where the baseboard management controller is configured to send a first interactive command to the specified logic device via the first communication interface, where the first interactive command is configured to indicate to send an interactive command of a specified interactive type to a specified accelerator card in the set of accelerator cards; and the specified logic device is configured to receive the first interactive command, query a command data set being prestored to obtain target command data in response to the first interactive command, convert the target command data into a second interactive command, and send the second interactive command to the specified accelerator card via the second communication interface, where the command data set includes a set of command data corresponding to each accelerator card in the set of accelerator cards, and the target command data is command data of the specified interactive type corresponding to the specified accelerator card.

Various method steps in the above embodiment may be performed by corresponding components in the interactive data transmission system, and those that have already been described will not be repeated here.

According to the above system provided in the embodiment of the present disclosure, by receiving a first interactive command sent by the baseboard management controller via the first communication interface through the specified logic device, where the first interactive command is configured to indicate to send an interactive command of a specified interactive type to a specified accelerator card in the set of accelerator cards; querying a command data set being prestored through the specified logic device to obtain target command data in response to the first interactive command, where the command data set includes a set of command data corresponding to each accelerator card in the set of accelerator cards, and the target command data is command data of the specified interactive type corresponding to the specified accelerator card; and converting the target command data into a second interactive command through the specified logic device, and sending the second interactive command to the specified accelerator card via the second communication interface through the specified logic device, the problem of low adaptation efficiency due to the need for the individual adaptation of various accelerator cards through the BMC in the interactive data transmission method in the related art is solved, and the adaptation efficiency of accelerator cards is improved.

According to another aspect of an embodiment of the present disclosure, there is further provided an interactive data transmission apparatus. The apparatus is used to implement the interactive data transmission method provided in the above embodiments, and those that have already been described will not be repeated here. As used below, the term "module" may be a combination of software and/or hardware that implements a predetermined function. Although the apparatus described in the following embodiments is implemented in software, but implementations in hardware, or a combination of software and hardware, are also possible and conceived.

Figure 7:
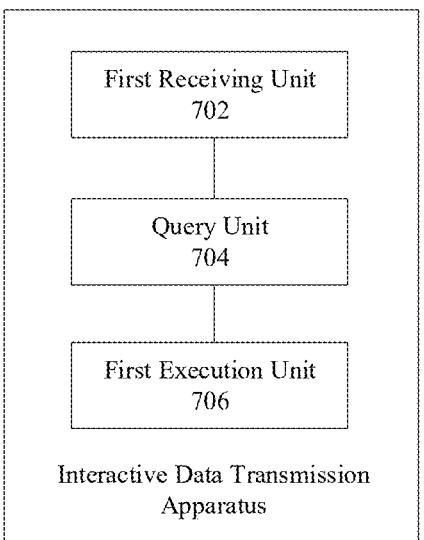
FIG. 7 is a structural block diagram of an interactive data transmission apparatus according to an embodiment of the present disclosure.

The interactive data transmission apparatus can be applied to a target device. The target device includes a baseboard management controller, a specified logic device and a set of accelerator cards, where the baseboard management controller sends an interactive command corresponding to the set of accelerator cards to the specified logic device and a communication interface being used is a first communication interface, the specified logic device sends an interactive command to the set of accelerator cards and a communication interface being used is a second communication interface. FIG. 7 is a structural block diagram of an interactive data transmission apparatus according to an embodiment of the present disclosure. As shown in FIG. 7, the apparatus includes:

a first receiving unit 702 configured to receive a first interactive command sent by the baseboard management controller via the first communication interface through the specified logic device, where the first interactive command is configured to indicate to send an interactive command of a specified interactive type to a specified accelerator card in the set of accelerator cards;

a query unit 704 configured to query a command data set being prestored through the specified logic device to obtain target command data in response to the first interactive command, where the command data set includes a set of command data corresponding to each accelerator card in the set of accelerator cards, and the target command data is command data of the specified interactive type corresponding to the specified accelerator card; and a first execution unit 706 configured to convert the target command data into a second interactive command through the specified logic device, and send the second interactive command to the specified accelerator card via the second communication interface through the specified logic device.

It should be noted that the first receiving unit 702 in this embodiment can be configured to perform the above step S202, the query unit 704 in this embodiment can be configured to perform the above step S204, and the first execution unit 706 in this embodiment can be configured to perform the above step S206.

According to the embodiment of the present disclosure, by receiving a first interactive command sent by the baseboard management controller via the first communication interface through the specified logic device, where the first interactive command is configured to indicate to send an interactive command of a specified interactive type to a specified accelerator card in the set of accelerator cards; querying a command data set being prestored through the specified logic device to obtain target command data in response to the first interactive command, where the command data set includes a set of command data corresponding to each accelerator card in the set of accelerator cards, and the target command data is command data of the specified interactive type corresponding to the specified accelerator card; and converting the target command data into a second interactive command through the specified logic device, and sending the second interactive command to the specified accelerator card via the second communication interface through the specified logic device, the problem of low adaptation efficiency due to the need for the individual adaptation of various accelerator cards through the BMC in the interactive data transmission method in the related art is solved, and the adaptation efficiency of accelerator cards is improved.

In an exemplary embodiment, the query unit includes:

an extraction module configured to extract an accelerator card identifier of the specified accelerator card and a specified command code from the first interactive command through the specified logic device in response to the first interactive command, where the specified command code is configured to identify the specified interactive type; and a first query module configured to query the command data set being prestored based on the accelerator card identifier of the specified accelerator card and the specified command code through the specified logic device to obtain the target command data.

In an exemplary embodiment, the first query module includes:

a first query submodule configured to query an address mapping table through the specified logic device based on the accelerator card identifier of the specified accelerator card and the specified command code to obtain first storage location information, where the first storage location information is configured to indicate a storage location of the command data of the specified interactive type corresponding to the specified accelerator card, and the address mapping table is configured to store a mapping relationship between a combination of the accelerator card identifier and the command code and the storage location of the command data corresponding to the combination; and a first extraction submodule configured to extract the target command data from the storage location indicated by the first storage location information through the specified logic device.

In an exemplary embodiment, the first query submodule includes:

a query subunit configured to query the address mapping table through the specified logic device based on the accelerator card identifier of the specified accelerator card and the specified command code to obtain first starting position information and first data length information, where the first starting position information is configured to indicate a starting storage location of the command data of the specified interactive type corresponding to the specified accelerator card, the first data length information is configured to indicate a data length of the command data of the specified interactive type corresponding to the specified accelerator card, and the first storage location information includes the first starting position information and the first data length information.

In an exemplary embodiment, each command data in the command data set is stored in a specified data structure in a specified data structure set, and each specified data structure in the specified data structure set includes a data header and a data body, where the data header includes a storage location field for storing a storage location of corresponding command data, an accelerator card identifier field for storing the accelerator card identifier of the corresponding accelerator card and a command code field for storing a corresponding command code, and the data body is configured to store the corresponding command data, and the first query module includes:

a second query submodule configured to sequentially query the accelerator card identifier field and the command code field of the data header of the each specified data structure based on the accelerator card identifier of the specified accelerator card and the specified command code through the specified logic device;

a second extraction submodule configured to extract second storage location information from the storage location field of the data header of a target data structure through the specified logic device in response to finding the target data structure, where the accelerator card identifier stored in the accelerator card identifier field of the data header of the target data structure is the same as the accelerator card identifier of the specified accelerator card, the command code stored in the command code field of the data header of the target data structure is the same as the specified command code, and the second storage location information is configured to indicate a storage location of the command data stored in the target data structure; and a third extraction submodule configured to extract the target command data from the storage location indicated by the second storage location information through the specified logic device In an exemplary embodiment, the storage location field includes a starting position field for storing a starting storage location of the corresponding command data and a data length field for storing a data length of the corresponding command data, and the second extraction submodule includes:

an extraction subunit configured to extract second starting position information from the starting position field of the data header of the target data structure and extract second data length information from the data length field through the specified logic device in response to finding the target data structure, where the second starting position information is configured to indicate a starting storage location of command data corresponding to the target data structure, the second data length information is configured to indicate a data length of the command data corresponding to the target data structure, and the second storage location information includes the second starting position information and the second data length information.

In an exemplary embodiment, the each specified data structure further includes a check data section for storing check data of the corresponding command data, and the above apparatus further includes:

a first extraction unit configured to extract first check data from the check data section of the target data structure through the specified logic device in response to finding the target data structure; and a first check unit configured to check the target command data based on the first check data through the specified logic device, where converting the target command data into the second interactive command is performed in the case where the target command data is successfully checked.

In an exemplary embodiment, the extraction module includes:

a fourth extraction submodule configured to extract an accelerator card number of the specified accelerator card and the specified command code from the first interactive command through the specified logic device in response to the first interactive command, where the accelerator card identifier of the specified accelerator card includes the accelerator card number of the specified accelerator card, the specified command code belongs to a set of preset command codes, and the specified interactive type belongs to a set of preset interactive types, where preset command codes in the set of preset command codes correspond to preset interactive types in the set of preset interactive types one by one, and are the same as preset command codes of command data of the same interactive type corresponding to different accelerator cards in the set of accelerator cards.

In an exemplary embodiment, the apparatus further includes:

a second execution unit configured to search a command code mapping table corresponding to the accelerator card number of the specified accelerator card based on the specified command code through the specified logic device, and update the specified command code to a found command code to obtain an updated specified command code, where the command code mapping table is configured to store a mapping relationship between each preset command code in the set of preset command codes and the command code configured for the specified accelerator card.

In an exemplary embodiment, the apparatus further includes:

an obtaining unit configured to obtain second check data of the target command data from check data of each command data in the command data set being prestored through the specified logic device; and a second check unit configured to check the target command data based on the second check data through the specified logic device, where converting the target command data into the second interactive command is performed in the case where the target command data is successfully checked.

In an exemplary embodiment, the query unit includes:

a second query module configured to query the command data set prestored in an electrically erasable programmable read only memory of the target device through the specified logic device to obtain the target command data in response to the first interactive command.

In an exemplary embodiment, the first receiving unit includes:

a first receiving module configured to receive the first interactive command sent by the baseboard management controller via a first communication bus via the first communication interface through the specified logic device, where the first communication interface includes an inter-integrated circuit (I2C) interface, and the first communication bus includes an I2C bus.

In an exemplary embodiment, the first execution unit includes:

a first sending module configured to send the second interactive command to the specified accelerator card via a second communication bus via the second communication interface through the specified logic device, where the second communication interface includes an inter-integrated circuit (I2C) interface, and the second communication bus includes an I2C bus.

In an exemplary embodiment, the query unit includes:

an execution module configured to send a data query command to a specified memory via the second communication bus through the specified logic device in response to the first interactive command, and receive the target command data returned by the specified memory via the second communication bus, where the command data set is prestored in the specified memory, and the data query command is configured to query the command data of the specified interactive type corresponding to the specified accelerator card.

In an exemplary embodiment, the second interactive command carries an accelerator card address of the specified accelerator card, and the above apparatus further includes:

a third execution unit configured to receive the second interactive command from the second communication bus via the I2C interface of the specified accelerator card through the specified accelerator card, and extract the accelerator card address carried in the second interactive command after sending the second interactive command to the specified accelerator card via the second communication interface through the specified logic device;

a second extraction unit configured to extract the target command data from the second interactive command through the specified accelerator card in response to determining that the accelerator card address carried in the second interactive command is the same as the accelerator card address of the specified accelerator card; and a fourth execution unit configured to convert first response data of the target command data into a first response command through the specified accelerator card in response to the target command data, and send the first response command to the specified logic device via the second communication bus through the I2C interface of the specified accelerator card to enable the specified logic device to send the first response data carried in the first response command to the baseboard management controller.

In an exemplary embodiment, the apparatus further includes:

a second receiving unit configured to receive a second response command returned by the specified accelerator card in response to the second interactive command through the specified logic device after sending the second interactive command to the specified accelerator card via the second communication interface through the specified logic device;

a parsing unit configured to perform command parsing on the second response command through the specified logic device to obtain second response data in response to the second response command; and a transmission unit configured to transmit the second response data to the baseboard management controller through the specified logic device.

In an exemplary embodiment, the transmission unit includes:

a setting module configured to set a state of a general purpose input/output interface between the specified logic device and the baseboard management controller through the specified logic device to inform the baseboard management controller that there is response data to be obtained based on a change of the state of the general purpose input/output interface;

a second receiving module configured to receive a response data obtaining command sent by the baseboard management controller through the specified logic device, where the response data obtaining command is configured to obtain response data sent to the baseboard management controller; and a second sending module configured to send the second response data to the baseboard management controller through the specified logic device in response to the response data obtaining command.

In an exemplary embodiment, the apparatus further includes:

a fifth execution unit configured to detect the state of the general purpose input/output interface through the baseboard management controller, trigger an interrupt of the general purpose input/output interface based on a detected state of the general purpose input/output interface, and send the response data obtaining command to the specified logic device after setting the state of the general purpose input/output interface between the specified logic device and the baseboard management controller through the specified logic device.

In an exemplary embodiment, the specified logic device includes a complex programmable logic device, the set of accelerator cards include artificial intelligence accelerator cards, and the interactive command of the specified interactive type includes one of following commands: a firmware version obtaining command, a temperature obtaining command, a power consumption obtaining command and a manufacturer information obtaining command.

According to another aspect of an embodiment of the present disclosure, there is further provided a computer non-transitory readable storage medium. The computer non-transitory readable storage medium stores a computer program, where the computer program, when executed by a processor, causes the processor to perform the steps in any one of the above method embodiments.

In an exemplary embodiment, the above computer non-transitory readable storage medium can include, but is not limited to, various media that may store computer programs, for example, a USB flash disk, a read-only memory (ROM), a random access memory (RAM), a mobile hard disk drive, a magnetic disk, or an optical disk.

According to an aspect of the present disclosure, there is provided a computer program product. The computer program product includes a computer program/instruction that contains a program code for executing the method shown in the flowchart. In such an embodiment, referring to FIG. 8, the computer program can be downloaded and installed from the network via a communication section 809, and/or installed from a removable non-transitory readable storage medium 811. Various functions provided by the embodiments of the present disclosure are performed when the computer program is executed by a central processing unit 801. The above serial numbers of the embodiments of the present disclosure are only for description, and do not represent the advantages and disadvantages of the embodiments.

Figure 8:
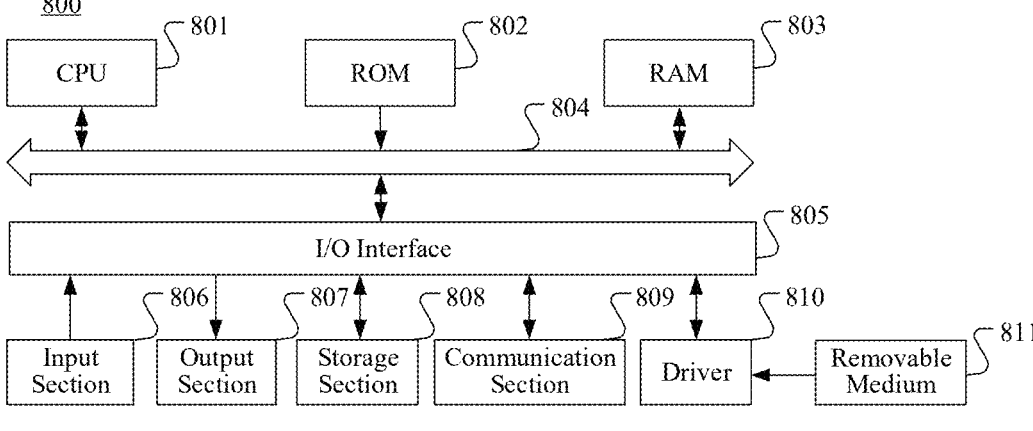
FIG. 8 is a structural block diagram of a computer system of an electronic device provided in an embodiment of the present disclosure.

Referring to FIG. 8, FIG. 8 is a structural block diagram of a computer system of an electronic device provided in an embodiment of the present disclosure.

FIG. 8 schematically shows a block diagram of a structure of a computer system for implementing an electronic device of an embodiment of the present disclosure. As shown in FIG. 8, a computer system 800 includes a central processing unit (CPU) 801, which can perform various appropriate actions and processes according to a program stored in a read-only memory (ROM) 802 or a program loaded from a storage section 808 into a random access memory (RAM) 803. In the random access memory 803, various programs and data required for system operations are also stored. The central processing unit 801, the read-only memory 802 and the random access memory 803 are connected to each other through a bus 804. An input/output interface 805 (I/O interface) is also connected to the bus 804.

The following components are connected to the input/output interface 805: an input section 806 including a keyboard, a mouse, and the like; an output section 807 including, for example, a cathode ray tube (CRT), a liquid crystal display (LCD) and a speaker; a storage section 808 including a hard disk, and the like; and a communication section 809 including a network interface card such as a local area network (LAN) card, a modem, and the like. The communication section 809 performs communication processing via a network such as Internet.

A driver 810 is also connected to the input/output interface 805 as needed. A removable non-transitory readable storage medium 811, for example, a magnetic disk, an optical disk, a magneto-optical disk, a semiconductor memory, and the like, is installed on the driver 810 as needed, so that the computer program read out therefrom is installed into the storage section 808 as needed.

In particular, the processes described in various method flowcharts may be implemented as computer software programs according to the embodiments of the present disclosure. For example, the embodiments of the present disclosure include a computer program product including a computer program carried on a computer non-transitory readable storage medium, and the computer program includes a program code for performing the method shown in the flowchart. In such an embodiment, the computer program may be downloaded and installed from a network via the communication section 809, and/or installed from the removable non-transitory readable storage medium 811. The computer program, when executed by the central processing unit 801, performs various functions defined in the system of the present disclosure.

It should be noted that the computer system 800 of the electronic device shown in FIG. 8 is only an example, and does not impose any limitation on a function and use scope of the embodiments of the present disclosure.

According to another aspect of an embodiment of the present disclosure, there is further provided an electronic device, including: a memory and a processor, where the memory stores a computer program, and the processor is configured to run the computer program to perform the steps in any one of the above method embodiments.

In an exemplary embodiment of the present disclosure, the above electronic device may further include a transmission device and an input/output device, where the transmission device is connected to the above processor, and the input/output device is connected to the above processor.

Specific examples in this embodiment may refer to the examples described in the above embodiments and exemplary implementations, and this embodiment will not be repeated here.

Obviously, a person skilled in the art should understand that the above modules or steps of the present disclosure may be realized by a general computing device and may also be gathered together on a single computing device or distributed in a network composed of multiple computing devices. The above modules or steps of the present disclosure may be implemented with program codes executable by the computing device, so that may be stored in a storage device for execution by the computing device, and in some cases, the steps shown or described may be performed in a different sequence than herein, or may be fabricated into individual integrated circuit modules respectively, or multiple modules or steps thereof are fabricated into a single integrated circuit module for implementation. In this way, the present disclosure is not limited to any specific combination of hardware and software.

The above are only preferred embodiments of the present disclosure and are not intended to limit the present disclosure. For a person skilled in the art, the present disclosure may have various modifications and variations. Any modifications, equivalent replacements, improvements and the like made within the principles of the present disclosure shall fall within the scope of protection of the present disclosure.

The invention claimed is:

1. An interactive data transmission method, applied to a target device, wherein the target device comprises a baseboard management controller, a specified logic device and a set of accelerator cards, wherein the baseboard management controller sends an interactive command corresponding to the set of accelerator cards to the specified logic device and a communication interface being used is a first communication interface, the specified logic device sends an interactive command to the set of accelerator cards and a communication interface being used is a second communication interface, and the method comprises:

receiving a first interactive command sent by the baseboard management controller via the first communication interface through the specified logic device, wherein the first interactive command is configured to indicate to send an interactive command of a specified interactive type to a specified accelerator card in the set of accelerator cards;

querying a command data set being prestored through the specified logic device to obtain target command data in response to the first interactive command, wherein the command data set comprises a set of command data corresponding to each accelerator card in the set of accelerator cards, and the target command data is command data of the specified interactive type corresponding to the specified accelerator card; and converting the target command data into a second interactive command through the specified logic device, and sending the second interactive command to the specified accelerator card via the second communication interface through the specified logic device.

2. The method according to claim 1, wherein querying the command data set being prestored through the specified logic device to obtain the target command data in response to the first interactive command comprises:

extracting an accelerator card identifier of the specified accelerator card and a specified command code from the first interactive command through the specified logic device in response to the first interactive command, wherein the specified command code is configured to identify the specified interactive type; and querying the command data set being prestored based on the accelerator card identifier of the specified accelerator card and the specified command code through the specified logic device to obtain the target command data.

3. The method according to claim 2, wherein querying the command data set being prestored based on the accelerator card identifier of the specified accelerator card and the specified command code through the specified logic device to obtain the target command data comprises:

querying an address mapping table through the specified logic device based on the accelerator card identifier of the specified accelerator card and the specified command code to obtain first storage location information, wherein the first storage location information is configured to indicate a storage location of the command data of the specified interactive type corresponding to the specified accelerator card, and the address mapping table is configured to store a mapping relationship between a combination of the accelerator card identifier and the command code and the storage location of the command data corresponding to the combination; and extracting the target command data from the storage location indicated by the first storage location information through the specified logic device.

4. The method according to claim 3, wherein querying the address mapping table through the specified logic device based on the accelerator card identifier of the specified accelerator card and the specified command code to obtain the first storage location information comprises:

querying the address mapping table through the specified logic device based on the accelerator card identifier of the specified accelerator card and the specified command code to obtain first starting position information and first data length information, wherein the first starting position information is configured to indicate a starting storage location of the command data of the specified interactive type corresponding to the specified accelerator card, the first data length information is configured to indicate a data length of the command data of the specified interactive type corresponding to the specified accelerator card, and the first storage location information comprises the first starting position information and the first data length information.

5. The method according to claim 2, wherein each command data in the command data set is stored in a specified data structure in a specified data structure set, and each specified data structure in the specified data structure set comprises a data header and a data body, wherein the data header comprises a storage location field for storing a storage location of command data, an accelerator card identifier field for storing the accelerator card identifier of the accelerator card and a command code field for storing a command code, and the data body is configured to store the command data, and querying the command data set being prestored based on the accelerator card identifier of the specified accelerator card and the specified command code through the specified logic device to obtain the target command data comprises:

sequentially querying the accelerator card identifier field and the command code field of the data header of the each specified data structure based on the accelerator card identifier of the specified accelerator card and the specified command code through the specified logic device;

extracting second storage location information from the storage location field of the data header of a target data structure through the specified logic device in response to finding the target data structure, wherein the accelerator card identifier stored in the accelerator card identifier field of the data header of the target data structure is the same as the accelerator card identifier of the specified accelerator card, the command code stored in the command code field of the data header of the target data structure is the same as the specified command code, and the second storage location information is configured to indicate a storage location of the command data stored in the target data structure; and extracting the target command data from the storage location indicated by the second storage location information through the specified logic device.

6. The method according to claim 5, wherein the storage location field comprises a starting position field for storing a starting storage location of the command data and a data length field for storing a data length of the command data, and extracting the second storage location information from the storage location field of the data header of the target data structure through the specified logic device in response to finding the target data structure comprises:

extracting second starting position information from the starting position field of the data header of the target data structure and extracting second data length information from the data length field through the specified logic device in response to finding the target data structure, wherein the second starting position information is configured to indicate a starting storage location of command data corresponding to the target data structure, the second data length information is configured to indicate a data length of the command data corresponding to the target data structure, and the second storage location information comprises the second starting position information and the second data length information.

7. The method according to claim 5, wherein the each specified data structure further comprises a check data section for storing check data of the command data, and the method further comprises:

extracting first check data from the check data section of the target data structure through the specified logic device in response to finding the target data structure; and checking the target command data based on the first check data through the specified logic device, wherein converting the target command data into the second interactive command is performed in the case where the target command data is successfully checked.

8. The method according to claim 2, wherein extracting the accelerator card identifier of the specified accelerator card and the specified command code from the first interactive command through the specified logic device in response to the first interactive command comprises:

extracting an accelerator card number of the specified accelerator card and the specified command code from the first interactive command through the specified logic device in response to the first interactive command, wherein the accelerator card identifier of the specified accelerator card comprises the accelerator card number of the specified accelerator card, the specified command code belongs to a set of preset command codes, and the specified interactive type belongs to a set of preset interactive types, wherein preset command codes in the set of preset command codes correspond to preset interactive types in the set of preset interactive types one by one, and are the same as preset command codes of command data of the same interactive type corresponding to different accelerator cards in the set of accelerator cards.

9. The method according to claim 8, wherein before querying the command data set being prestored based on the accelerator card identifier of the specified accelerator card and the specified command code through the specified logic device to obtain the target command data, the method further comprises:

searching a command code mapping table corresponding to the accelerator card number of the specified accelerator card based on the specified command code through the specified logic device, and updating the specified command code to a found command code to obtain an updated specified command code, wherein the command code mapping table is configured to store a mapping relationship between each preset command code in the set of preset command codes and the command code configured for the specified accelerator card.

10. The method according to claim 1, wherein before converting the target command data into the second interactive command through the specified logic device, the method further comprises:

obtaining second check data of the target command data from check data of each command data in the command data set being prestored through the specified logic device; and checking the target command data based on the second check data through the specified logic device, wherein converting the target command data into the second interactive command is performed in the case where the target command data is successfully checked.

11. The method according to claim 1, wherein querying the command data set being prestored through the specified logic device to obtain the target command data in response to the first interactive command comprises:

querying the command data set prestored in an electrically erasable programmable read only memory of the target device through the specified logic device to obtain the target command data in response to the first interactive command;

receiving the first interactive command sent by the baseboard management controller via the first communication interface through the specified logic device comprises:

receiving the first interactive command sent by the baseboard management controller via a first communication bus via the first communication interface through the specified logic device, wherein the first communication interface comprises an inter-integrated circuit (I2C) interface, and the first communication bus comprises an I2C bus; and sending the second interactive command to the specified accelerator card via the second communication interface through the specified logic device comprises:

sending the second interactive command to the specified accelerator card via a second communication bus via the second communication interface through the specified logic device, wherein the second communication interface comprises an inter-integrated circuit (I2C) interface, and the second communication bus comprises an I2C bus.

12. The method according to claim 11, wherein querying the command data set being prestored through the specified logic device to obtain the target command data in response to the first interactive command comprises:

sending a data query command to a specified memory via the second communication bus through the specified logic device in response to the first interactive command, and receiving the target command data returned by the specified memory via the second communication bus, wherein the command data set is prestored in the specified memory, and the data query command is configured to query the command data of the specified interactive type corresponding to the specified accelerator card.

13. The method according to claim 11, wherein the second interactive command carries an accelerator card address of the specified accelerator card, and after sending the second interactive command to the specified accelerator card via the second communication interface through the specified logic device, the method further comprises:

receiving the second interactive command from the second communication bus via the I2C interface of the specified accelerator card through the specified accelerator card, and extracting the accelerator card address carried in the second interactive command;

extracting the target command data from the second interactive command through the specified accelerator card in response to determining that the accelerator card address carried in the second interactive command is the same as the accelerator card address of the specified accelerator card; and converting first response data of the target command data into a first response command through the specified accelerator card in response to the target command data, and sending the first response command to the specified logic device via the second communication bus through the I2C interface of the specified accelerator card to enable the specified logic device to send the first response data carried in the first response command to the baseboard management controller.

14. The method according to claim 1, wherein after sending the second interactive command to the specified accelerator card via the second communication interface through the specified logic device, the method further comprises:

receiving a second response command returned by the specified accelerator card in response to the second interactive command through the specified logic device;

performing command parsing on the second response command through the specified logic device to obtain second response data in response to the second response command; and transmitting the second response data to the baseboard management controller through the specified logic device.

15. The method according to claim 14, wherein transmitting the second response data to the baseboard management controller through the specified logic device comprises:

setting a state of a general purpose input/output interface between the specified logic device and the baseboard management controller through the specified logic device to inform the baseboard management controller that there is response data to be obtained based on a change of the state of the general purpose input/output interface;

receiving a response data obtaining command sent by the baseboard management controller through the specified logic device, wherein the response data obtaining command is configured to obtain response data sent to the baseboard management controller; and sending the second response data to the baseboard management controller through the specified logic device in response to the response data obtaining command.

16. The method according to claim 15, wherein after setting the state of the general purpose input/output interface between the specified logic device and the baseboard management controller through the specified logic device, the method further comprises:

detecting the state of the general purpose input/output interface through the baseboard management controller, triggering an interrupt of the general purpose input/output interface based on a detected state of the general purpose input/output interface, and sending the response data obtaining command to the specified logic device.

17. The method according to claim 1, wherein the specified logic device comprises a complex programmable logic device, the set of accelerator cards comprise artificial intelligence accelerator cards, and the interactive command of the specified interactive type comprises one of following commands: a firmware version obtaining command, a temperature obtaining command, a power consumption obtaining command and a manufacturer information obtaining command.

18. A computer non-transitory readable storage medium, wherein the computer non-transitory readable storage medium stores a computer program, wherein the computer program, when executed by a processor, causes the processor to implement the method described in claim 1.

19. An electronic device, comprising: a memory, a processor and a computer program stored on the memory and executable on the processor, wherein the computer program, when executed by the processor, causes the processor to implement the method described in claim 1.

20. An interactive data transmission system, comprising: a baseboard management controller, a specified logic device and a set of accelerator cards, wherein the baseboard management controller sends an interactive command corresponding to the set of accelerator cards to the specified logic device and a communication interface being used is a first communication interface, the specified logic device sends an interactive command to the set of accelerator cards and a communication interface being used is a second communication interface, wherein the baseboard management controller is configured to send a first interactive command to the specified logic device via the first communication interface, wherein the first interactive command is configured to indicate to send an interactive command of a specified interactive type to a specified accelerator card in the set of accelerator cards; and the specified logic device is configured to receive the first interactive command, query a command data set being prestored to obtain target command data in response to the first interactive command, convert the target command data into a second interactive command, and send the second interactive command to the specified accelerator card via the second communication interface, wherein the command data set comprises a set of command data corresponding to each accelerator card in the set of accelerator cards, and the target command data is command data of the specified interactive type corresponding to the specified accelerator card.

* * * * *